(12) United States Patent
Rabska et al.

(10) Patent No.: US 7,407,151 B2
(45) Date of Patent: Aug. 5, 2008

(54) INTEGRATED JACK AND WINCH ASSEMBLY

(75) Inventors: Kevin M. Rabska, Plover, WI (US); Troy R. Hartwig, Hatley, WI (US)

(73) Assignee: Cequent Trailer Products, Inc., Mosinee, WI (US)

( * ) Notice: Subject to any disclaimer, the term of this patent is extended or adjusted under 35 U.S.C. 154(b) by 0 days.

(21) Appl. No.: 11/726,683

(22) Filed: Mar. 22, 2007

(65) Prior Publication Data

US 2007/0228348 A1    Oct. 4, 2007

Related U.S. Application Data (60) Provisional application No. 60/784,845, filed on Mar. 22, 2006.

(51) Int. Cl.
*B66D 1/14* (2006.01)

(52) U.S. Cl. .................................. 254/345; 254/325

(58) Field of Classification Search ................ 254/325, 254/334, 345
See application file for complete search history.

(56) References Cited

U.S. PATENT DOCUMENTS

| | | | |
|---|---|---|---|
| 1,867,760 A | 7/1932 | Richards | |
| 3,008,730 A | 11/1961 | Lisota | |
| 3,086,752 A * | 4/1963 | Wetter | 254/420 |
| 3,337,187 A | 8/1967 | Sumner | |
| 3,767,230 A * | 10/1973 | DeVries | 280/477 |
| 3,997,191 A | 12/1976 | Morgan | |
| 4,190,233 A * | 2/1980 | Godfrey | 254/4 B |
| 4,247,085 A | 1/1981 | Grimsrud | |
| 4,508,316 A * | 4/1985 | Millard | 254/4 R |
| 4,706,936 A * | 11/1987 | Riedl | 254/89 R |
| 5,040,937 A | 8/1991 | Godbersen | |
| 5,370,103 A * | 12/1994 | Desselle | 124/86 |
| 5,934,490 A * | 8/1999 | Mora | 212/176 |
| 6,086,083 A * | 7/2000 | Wilks | 280/479.1 |
| 6,386,572 B1 | 5/2002 | Cofer | |
| 6,431,525 B1 | 8/2002 | Roll | |
| 6,511,279 B1 | 1/2003 | Harkcom et al. | |
| 6,685,170 B1 * | 2/2004 | Gwynn | 354/325 |
| 6,726,236 B2 | 4/2004 | Cofer | |
| 2003/0020270 A1 | 1/2003 | Cofer | |

\* cited by examiner

*Primary Examiner*—Emmanuel M Marcelo
(74) *Attorney, Agent, or Firm*—McDonald Hopkins LLC; Robert H. Earp, III; David J. Smith (57) ABSTRACT

An embodiment of the present invention provides for a jack-winch assembly. The assembly includes a jack; a winch, secured to the jack; and a crank. The crank is independently engageable with the winch and the jack. The crank shifts between a first position, where the crank engages the winch, and a second position, where the crank engages the jack. In another embodiment, a jack-winch assembly is provided that includes a winch; a jack, secured to the winch; and a crank. The winch includes a base; a drum that is rotatably secured to the base; and a gear for driving the drum. The crank is engageable with both the gear and the jack to independently operate the winch and the jack. The crank includes an actuating member to shift the crank between a first position, where the crank engages the gear, and a second position, where the crank engages the jack.

20 Claims, 10 Drawing Sheets

INTEGRATED JACK AND WINCH ASSEMBLY

CROSS-REFERENCE TO RELATED APPLICATION

This non-provisional patent application claims the benefit of U.S. Provisional Patent Application No. 60/784,845, entitled "INTEGRATED JACK AND WINCH ASSEMBLY," filed Mar. 22, 2006, which is hereby incorporated in its entirety.

FIELD OF THE INVENTION

The present invention relates generally to jack systems for raising and lowering objects and to winch systems for pulling objects, and more particularly, to an integrated jack and winch assembly.

BACKGROUND

Jack mechanisms for raising and lowering objects relative to the ground and winch systems for pulling objects relative to a stationary object are known in the art. Further, these mechanisms are typically stand-alone mechanisms utilizing their own operational and mounting components. One particular use for such mechanisms is in the automotive industry for use with towed trailers that carry boats or other recreational vehicles. Typically, a pivot jack is mounted to the front end of a trailer for raising or lowering the trailer tongue relative to the ground. Further, a winch may also be mounted to the front end of a trailer so that objects such as boats or other objects may be pulled onto the trailer.

Numerous types of jack mechanisms are known which are mounted to a trailer to raise or lower the trailer tongue relative to the hitch of a towing vehicle typically for mounting or dismounting the trailers therefrom. These jacks also keep such trailers in a level position when the trailer is disengaged from the towing vehicle. Oftentimes, these jacks are pivotally mounted to the trailers so that the jack may be pivoted to a horizontal, stored position when not in use.

Winch mechanisms are also commonly used in the field to pull heavy loads. One such operation encompasses driving a trailer down the egress ramp of a lake or river and connecting the winch line to the boat. Once connected to the boat, the winch can be operated to pull the boat out of the water and onto the trailer or gently slide a boat from the trailer into the water. The winch is generally constructed such that the handle is connected through a pinion gear to a drum gear that is affixed to a drum. The pinion gear increases the torque capacity that an operator can handle. A reversible ratchet mechanism is selectively operable to restrict reel rotational movement in one direction while enabling rotation of the reel in the opposite direction. The pawl and ratchet arrangement can be selectively operable into a forward-engaged mode, a reverse-engaged mode, and a free-spooling mode.

In the prior art, the jack mechanism and the winch mechanism are separate mechanisms having separate components requiring their own mounting position, operation space, and operation components. The present invention offers advantages by reducing costs through the consolidation of components by integrating the jack and winch mechanisms. Such integration can permit one or more shared functions, shared mounting, or shared components. It is further contemplated that the invention may include the automatic retraction and pivot of the lower jack tube, typically having a wheel thereon, so that the lower jack portion can be automatically stored when not in use.

SUMMARY OF THE INVENTION

An embodiment of the present invention provides for a jack-winch assembly. The assembly includes a jack; a winch, secured to the jack; and a crank. The crank is independently engageable with the winch and the jack. The crank shifts between a first position, where the crank engages the winch, and a second position, where the crank engages the jack.

In another embodiment, a jack-winch assembly is provided that includes a winch; a jack, secured to the winch; and a crank. The winch includes a base; a drum that is rotatably secured to the base; and a gear for driving the drum. The crank is engageable with both the gear and the jack to independently operate the winch and the jack. The crank includes an actuating member to shift the crank between a first position, where the crank engages the gear, and a second position, where the crank engages the jack.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Referring now to the drawings, an embodiment of the jack-winch assembly 10 is shown. It should be noted that in the drawings and with reference to any embodiment, the same or similar features shown throughout are designated with the same reference numerals.

Figure 1:
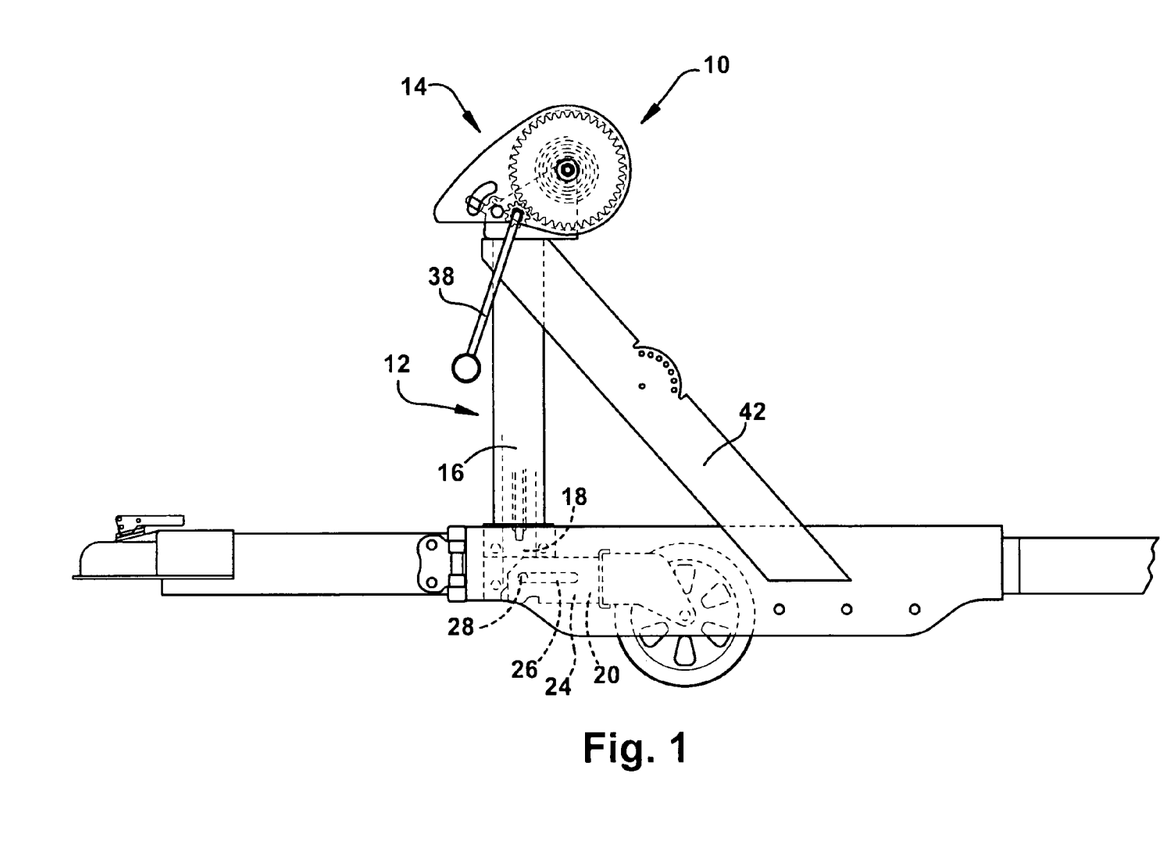
FIG. 1 is a side view of the integrated jack and winch assembly in accordance with the present invention wherein the jack wheel is pivoted to a stowed position.
Figure 2:
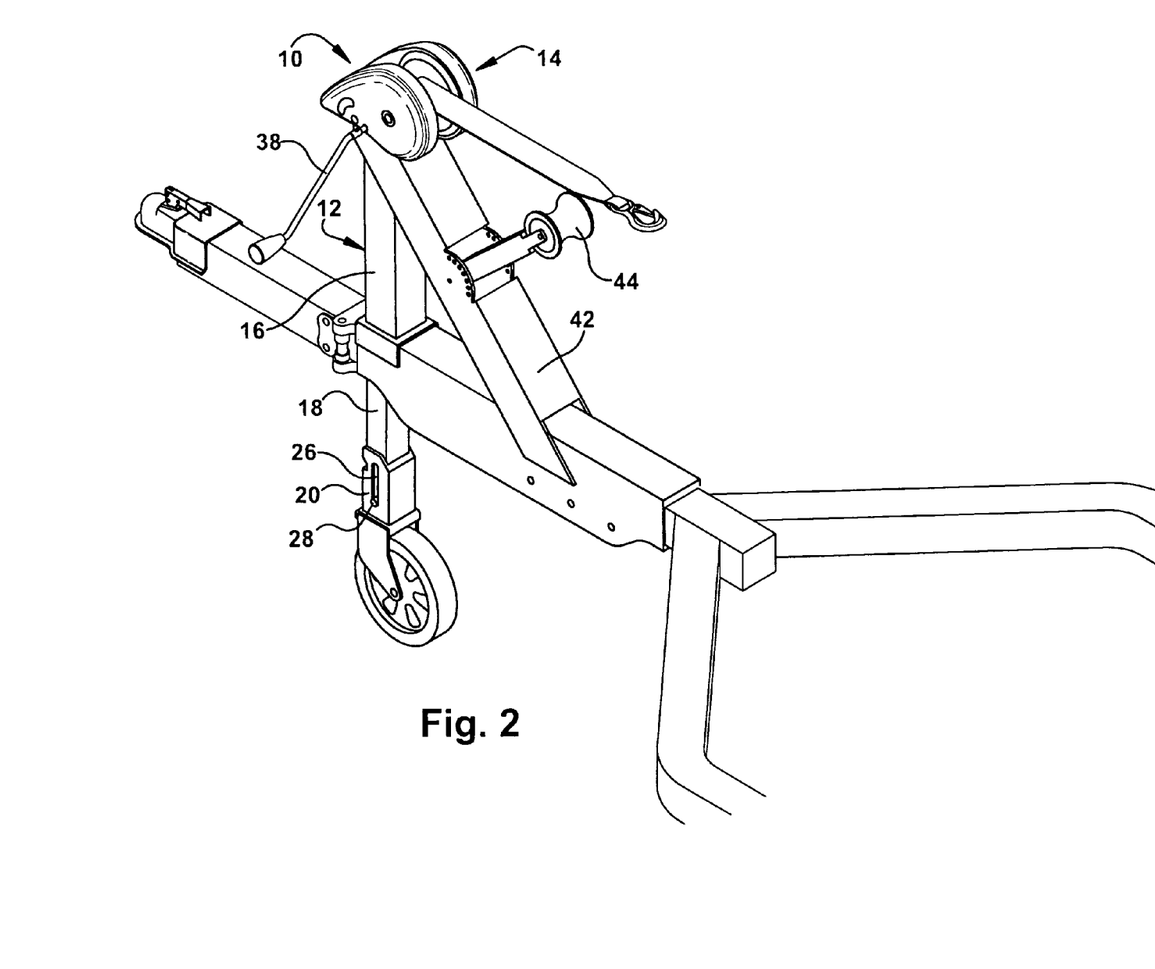
FIG. 2 is a perspective view of an integrated jack and winch assembly of FIG. 1 wherein the jack wheel is pivoted to a use position.
Figure 4A:
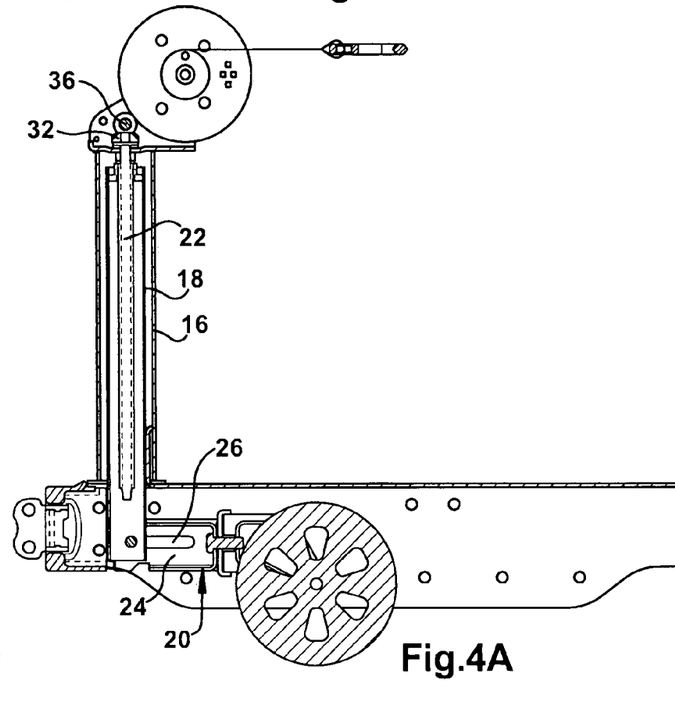
FIG. 4A is a cross-sectional view of the integrated jack and winch assembly of FIG. 1 taken along the line 4A-4A of FIG. 4B.
Figure 4B:
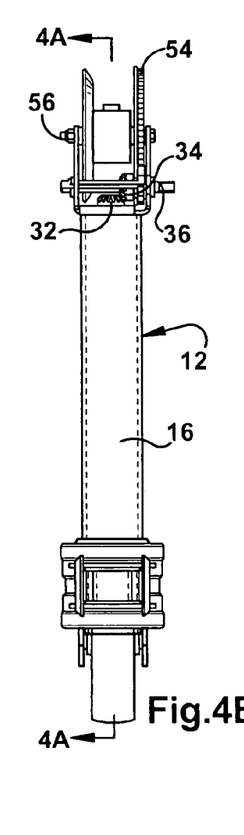
FIG. 4B is a front view of the integrated jack and winch assembly of FIG. 1.
Figure 4C:
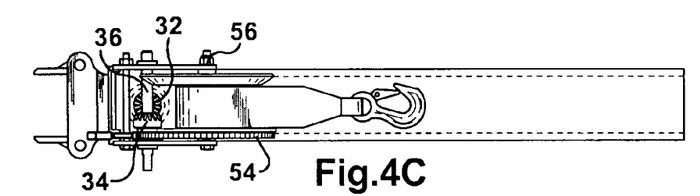
FIG. 4C is a top view of the integrated jack and winch assembly of FIG. 1.
Figure 4D:
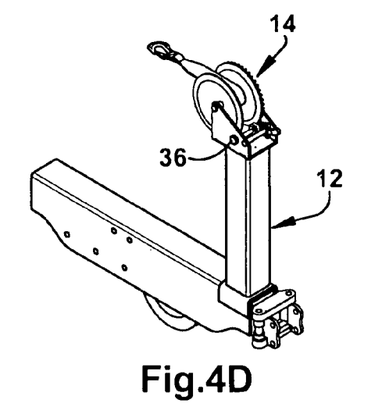
FIG. 4D is a perspective view of the integrated jack and winch assembly of FIG. 1.
Figure 4E:
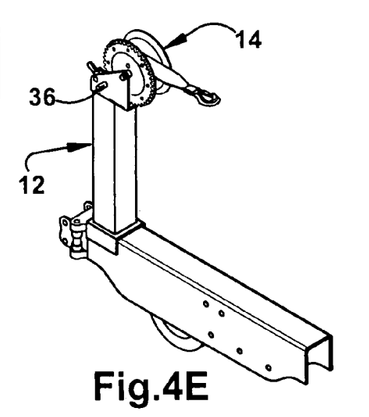
FIG. 4E is a perspective view of the integrated jack and winch assembly of FIG. 1.
Figure 5A:
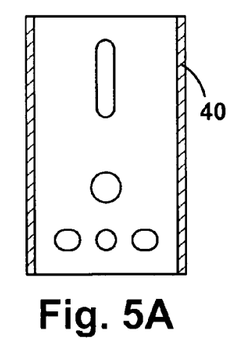
FIG. 5A is a cross-sectional view of the integrated jack and winch assembly of FIG. 1 taken along the line 5A-5A of FIG. 5C.
Figure 5B:
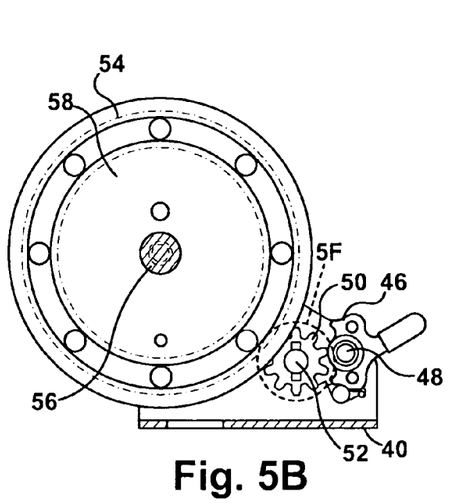
FIG. 5B is a cross-sectional view of the integrated jack and winch assembly of FIG. 1 taken along the line 5B-5B of FIG. 5C.
Figure 5C:
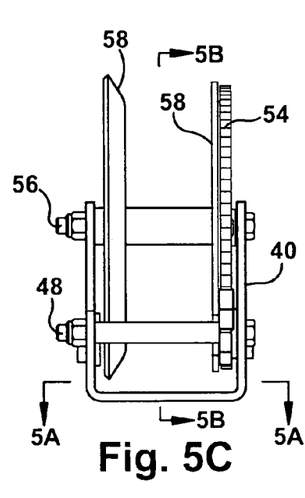
FIG. 5C is a front view of the integrated jack and winch assembly of FIG. 1.
Figure 5D:
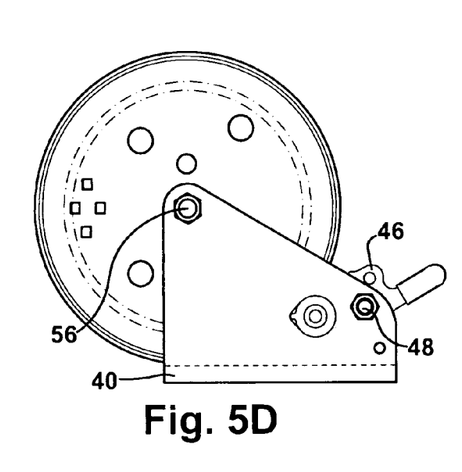
FIG. 5D is a side view of the integrated jack and winch assembly of FIG. 1.
Figure 5E:
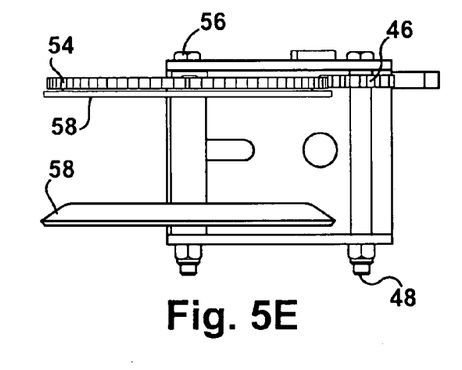
FIG. 5E is a top view of the integrated jack and winch assembly of FIG. 1.
Figure 5F:
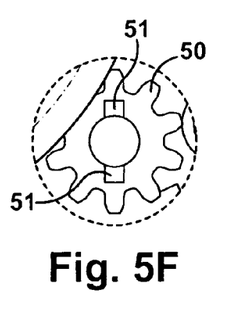
FIG. 5F is a view of the detail 5F of FIG. 5B.
Figure 6A:
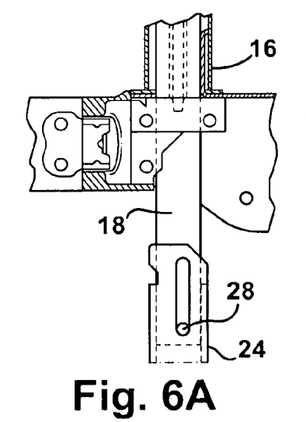
FIGS. 6A through 6L illustrate a progression of stowing a jack wheel of the integrated jack assembly of FIG. 1.
Figure 6B:
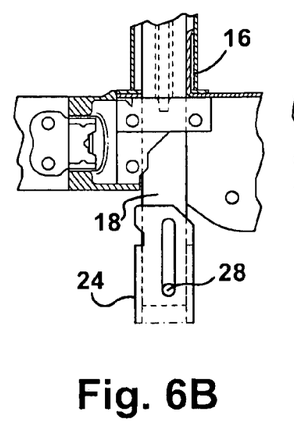
Figure 6C:
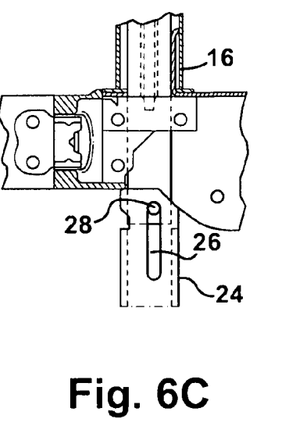
Figure 6D:
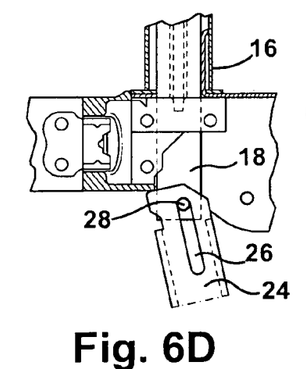
Figure 6E:
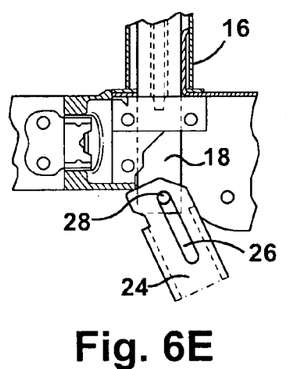
Figure 6F:
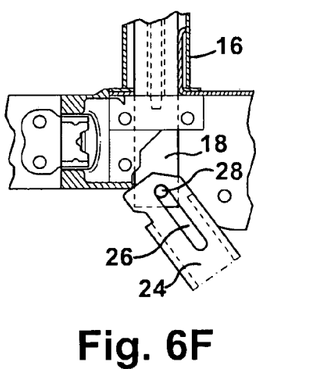
Figures 6G, 6H:
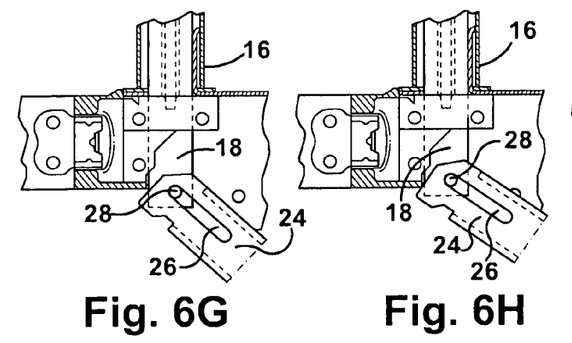
Figure 6I:
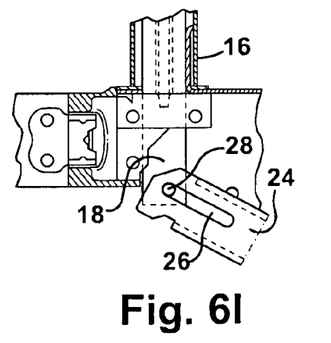
Figure 6J:
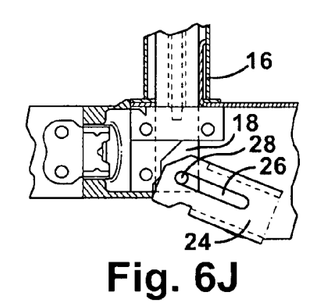
Figure 6K:
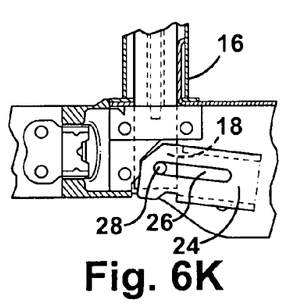
Figure 6L:
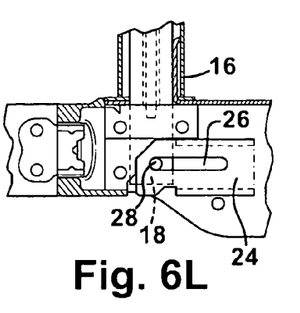
Figure 7:
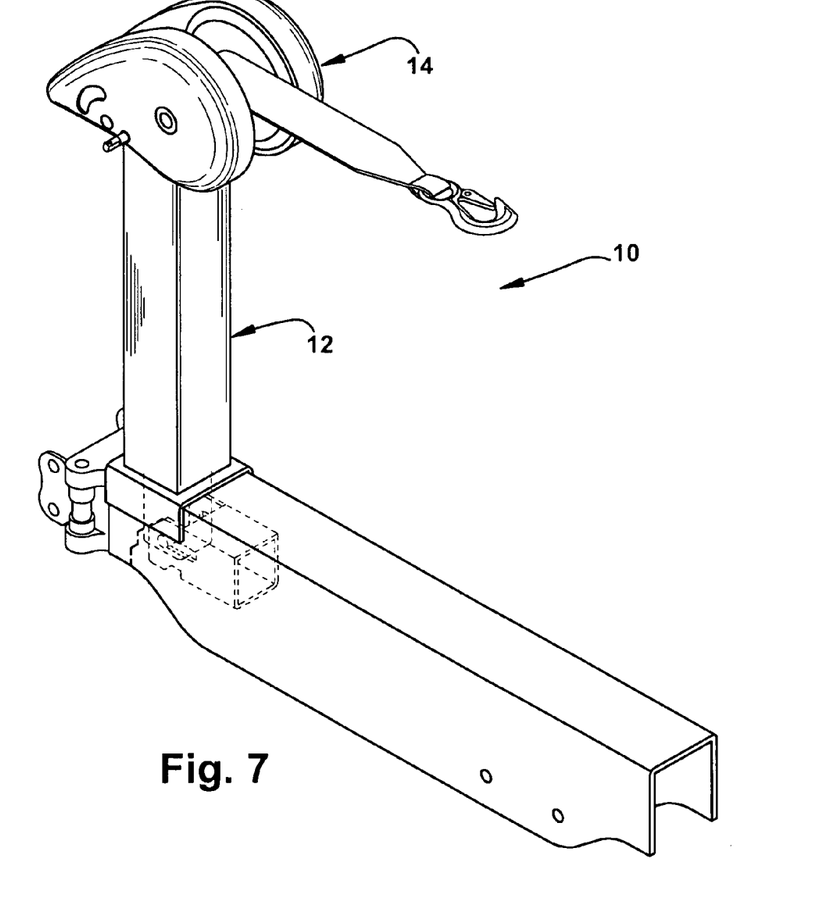
FIG. 7 is a perspective view of another embodiment of the integrated jack and winch assembly in accordance with the present invention.

Referring particularly to FIGS. 1 and 2, the jack and winch assembly 10 includes a jack portion 12 and a winch portion 14. The jack portion 12 includes an outer sleeve 16 and an inner sleeve 18 that are telescopically movable relative to each other. While it is noted that any type of jack can be utilized with the present invention, one embodiment utilizes a swing-away drop leg 20 that pivots between a extended position as shown in FIG. 2 and a retracted or stowed position as shown in FIG. 1. As shown in FIG. 4, the inner and outer sleeves 16 and 18 are movable by a jack screw 22 and nut configuration as is know in the art.

Figure 8A:
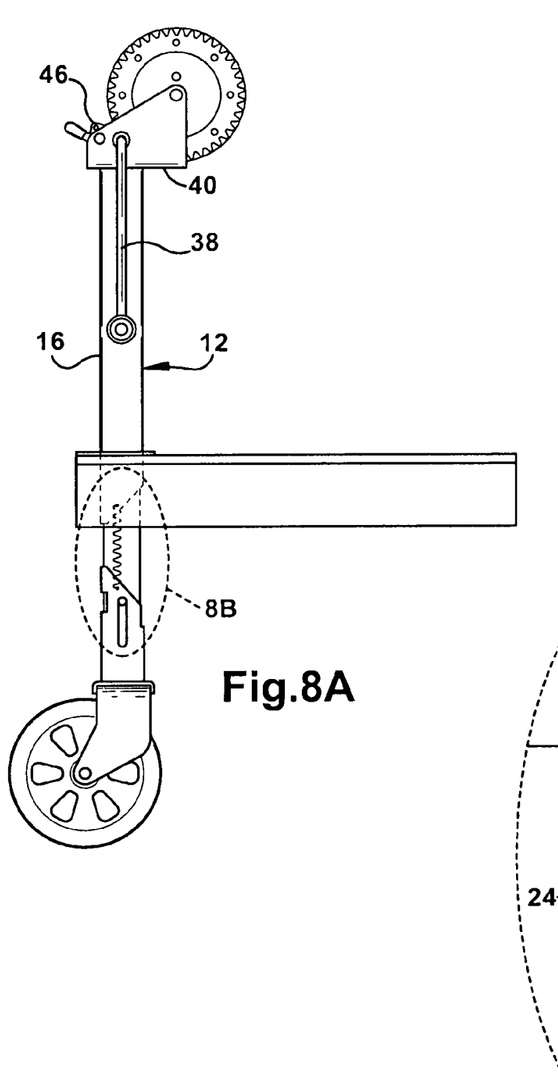
FIG. 8A is a side view of the integrated jack and winch assembly of FIG. 1.
Figure 8B:
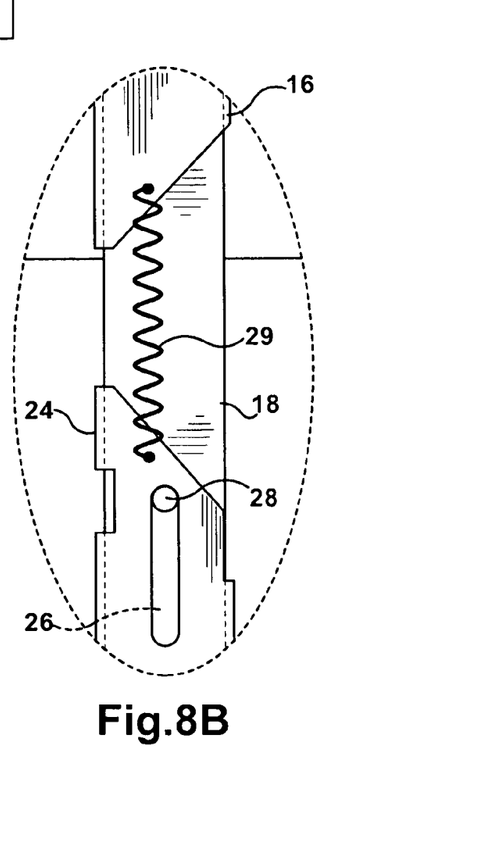
FIG. 8B is a view of the detail 8B of FIG. 8A.

As shown in FIG. 1, the drop leg 20 includes a sleeve member 24 having a longitudinal aperture 26 therein which receives a pin 28 mounted to the lower portion of inner sleeve 18. The sleeve member 24 slidingly engages the inner sleeve 18 so that when inner sleeve 18 is extended, the drop leg 20 pivots about the pin 28 to an extended position. However, when the drop leg 20 is not supporting the trailer tongue and the inner sleeve 18 is retracted, the drop leg 20 is retracted by the inner sleeve 18 and pivots about the pin 28 to rotate to a stowed position. As shown in FIG. 8A, an extension spring 29 may be secured between the outer sleeve 16 and the sleeve member 24 such that the spring 29 forces the sleeve member 24 to rotate about the pin 28 to a stowed position. Another embodiment of the drop leg pivoting mechanism is illustrated by FIGS. 6A through 6L, which show a progression of the drop leg from an extended position to a stowed position.

Figure 9A:
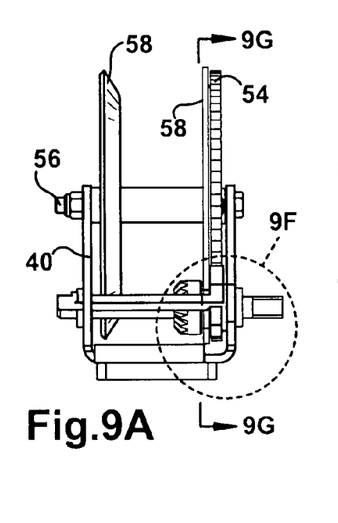
FIG. 9A is a front view of the integrated jack and winch assembly of FIG. 1.
Figure 9B:
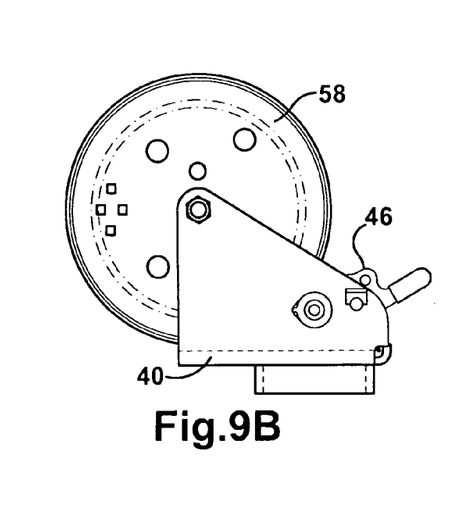
FIG. 9B is a side view of the integrated jack and winch assembly of FIG. 1.
Figure 9C:
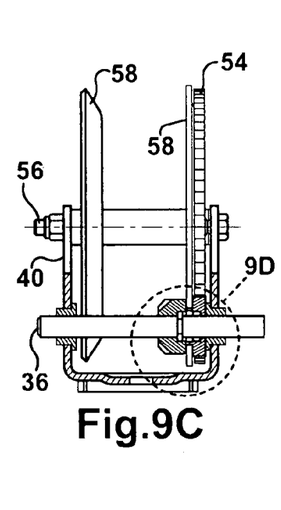
FIG. 9C is a cross-sectional view of the integrated jack and winch assembly of FIG. 1 taken along the line 9C-9C of FIG. 9E.
Figure 9D:
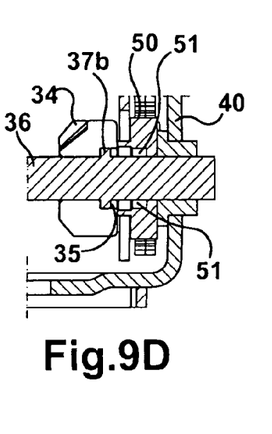
FIG. 9D is a view of the detail 9D of FIG. 9C.
Figure 9E:
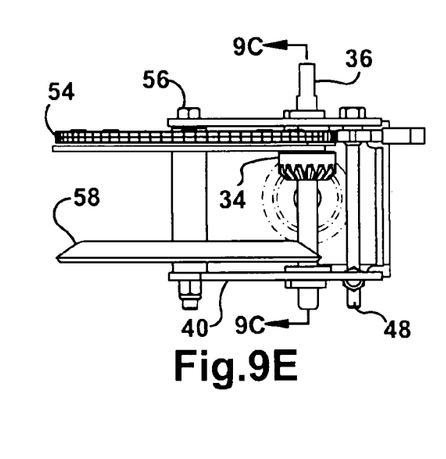
FIG. 9E is a top view of the integrated jack and winch assembly of FIG. 1.
Figure 9F:
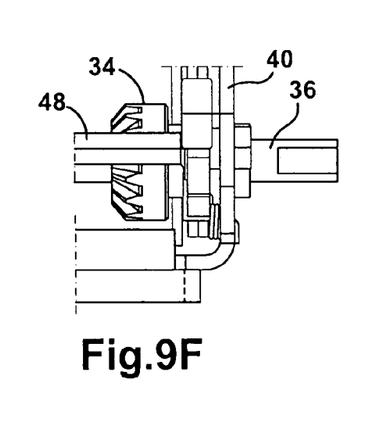
FIG. 9F is a view of the detail 9F of FIG. 9A.
Figure 9G:
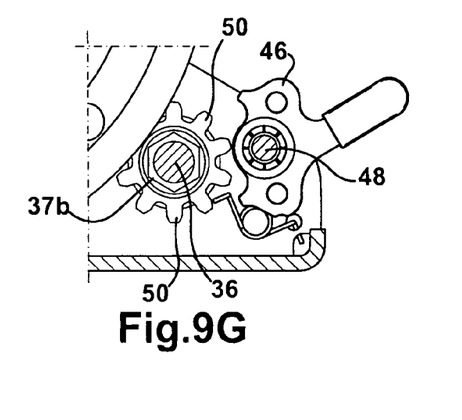
FIG. 9G is a partial cross-sectional view of the integrated jack and winch assembly of FIG. 1 taken along the line 9G-9G of FIG. 9A.
Figure 10:
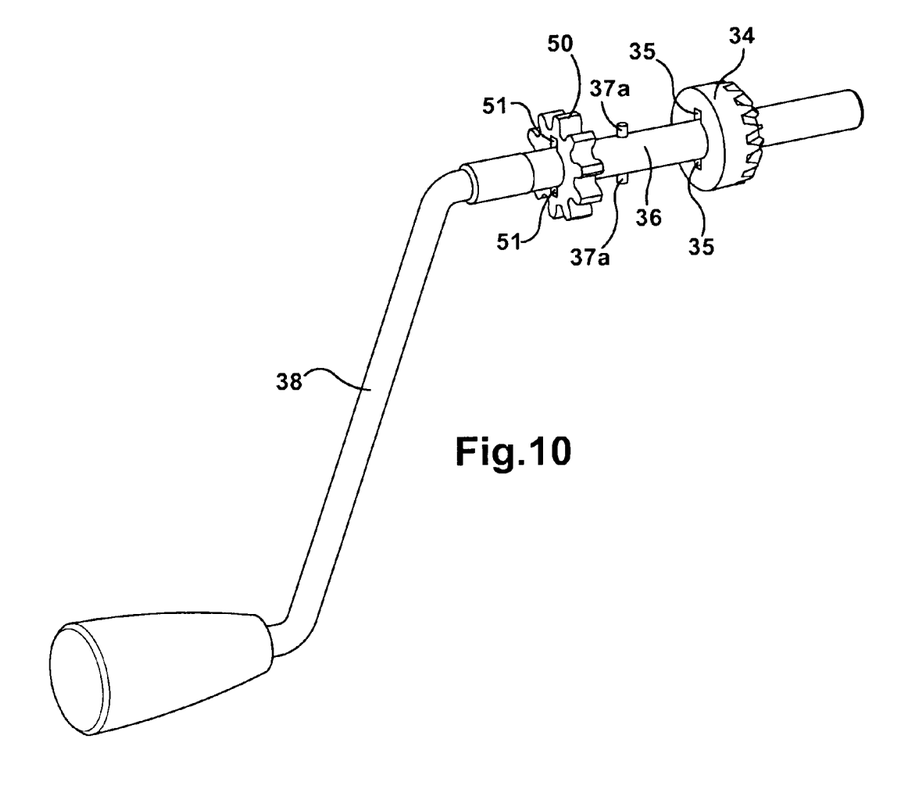
FIG. 10 is a perspective view of an engagement mechanism for use with the integrated jack and winch assembly of FIG. 1.

Referring to FIGS. 4A through 4E, the upper portion of the jack screw 22 is rigidly mounted to a screw bevel gear 32. In one embodiment, a crank 36 is a rod coaxially disposed within a crank bevel gear 34. The crank bevel gear 34 is mounted to the crank 36 such that the crank 36 may coaxially slide within the crank bevel gear 34. As shown in FIGS. 9 and 10, the crank bevel gear 34 includes a recess 35 complimentary in shape to engagingly receive an actuating member disposed on the crank 36. The actuating member may be one or more pins 37a (as best seen in FIG. 10), a nut having a triangular shape, a nut having a square shape, a nut having a hexagonal shape 37b (as best seen in FIG. 9G), a nut having any number of sides, or the like. Although FIG. 10 illustrates the pins 37a as a separate component from the crank 36, one skilled in the art will appreciate that the pins 37a may be integral with the crank 36. Similarly, any other embodiment of the actuating member, such as the hexagonal nut 37b illustrated in FIG. 9, may be integral with the crank 36. As mentioned, the recess 35 is complimentary in shape with the actuating member such that the recess 35 may engagingly receive an actuating member, such as, for example, a pin 37a or a hexagonal nut 37b. Further, crank 36 is mounted to a handle 38; therefore, when the crank 36 is positioned such that the actuating member engages the recess 35 of the bevel gear, the bevel gear 34 rotates in response to handle rotation and acts on the screw bevel gear 32. Thus, rotation of the handle 38 will in turn cause the rotation of the jack screw 22. Thus, the directional rotation of the jack screw 22 will determine whether the jack 12 is extended or retracted during use.

Figures 3A, 3C, 3D, 3E, 3F:
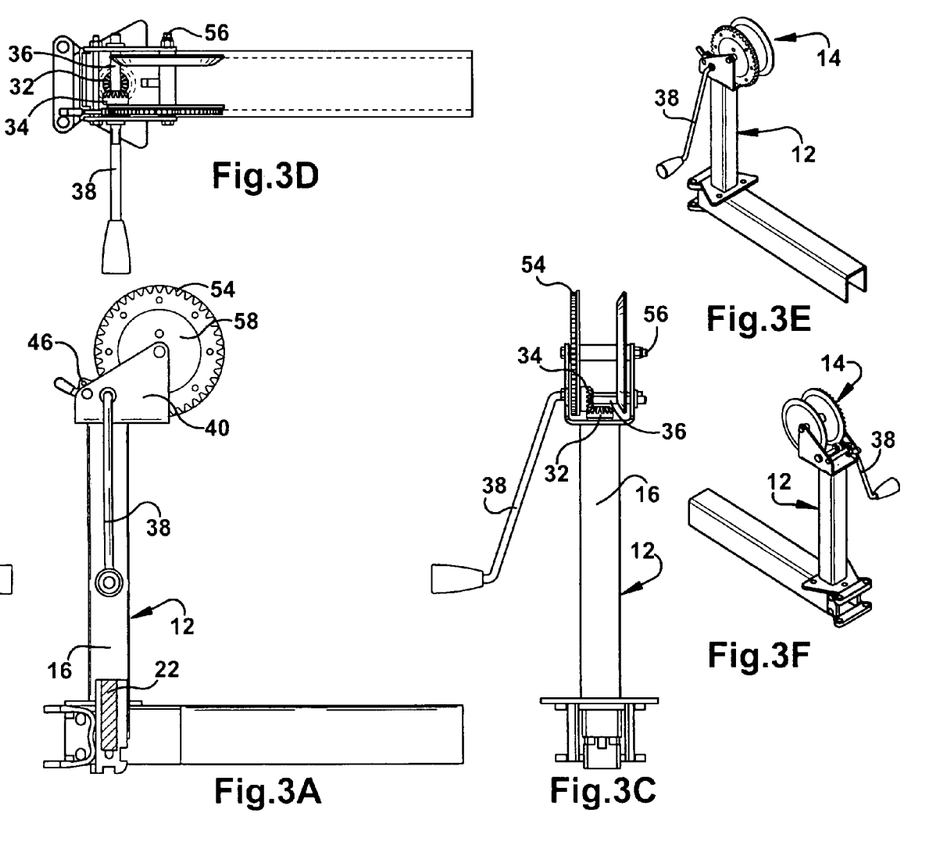
FIG. 3A is a side view of the integrated jack and winch assembly of FIG. 1.
FIG. 3C is a rear view of the integrated jack and winch assembly of FIG. 1.
FIG. 3D is a bottom view of the integrated jack and winch assembly of FIG. 1.
FIG. 3E is a perspective view of the integrated jack and winch assembly of FIG. 1.
FIG. 3F is a perspective view of the integrated jack and winch assembly of FIG. 1.
Figure 3B:
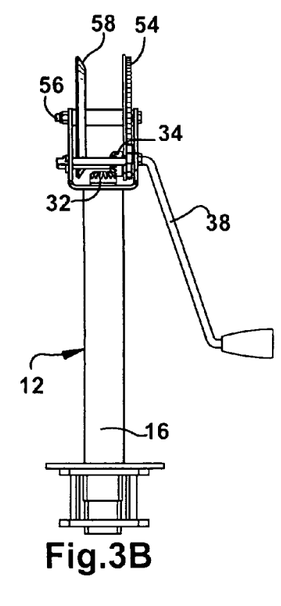
FIG. 3B is a front view of the integrated jack and winch assembly of FIG. 1.

Connected to the top of the jack 12 is the winch mechanism 14. The winch mechanism is similar to that shown in U.S. Pat. No. 6,431,525, which is hereby expressly incorporated in its entirety by reference herein. As best shown in FIGS. 3 through 5, the winch mechanism 14 includes a frame 40 which is mounted to the outer sleeve 16. As shown in FIG. 2, a support bracket 42 and a spool guide 44 can be utilized to increase the strength of the unit. The winch mechanism 14 includes two engaged modes selectable by a pawl 48: one mode enabling rotation of the pinion gear in a clockwise direction; and the other mode enabling rotation of the pinion gear in a counterclockwise direction. The winch mechanism 14 also includes a free-spooling mode that enables disengaged drum gear rotation in both directions.

The winch frame 40 is preferably a one-piece unit and includes a pair of parallel sidewalls. Three parallel axles extend across the winch frame 40 and through the parallel sidewalls: (1) the pawl 46 is mounted within the ratchet on a ratchet-pawl axle 48; (2) the pinion gear 50 is coaxially mounted to the crank 36 such that the crank 36 may coaxially slide within the pinion gear 50; and (3) the drum gear 54 is mounted onto a drum gear axle 56 of a drum 58. The drum gear 54 is continuously meshed with the pinion gear 50, since the pinion gear 50 is situated between a sidewall of the frame 40 and a guide wall of the drum 58 and the drum-gear axle 56 is fixed in the sidewalls of the winch frame 40. As shown in FIGS. 9 and 10, the pinion gear 50 includes a recess 51 complimentary in shape to engagingly receive an actuating member disposed on the crank 36. As shown in FIGS. 9 and 10, the actuating member may be the same as that which engages the crank bevel gear 34, or a separate actuating member that only engages the pinion gear 50. As previously discussed, the actuating member may be one or more pins 37a, a hexagonal nut 37b, or the like. The operation of the winch 14 is as described in U.S. Pat. No. 6,431,525 and will not be further described herein. However, it will be appreciated that when the crank 36 is positioned such that the actuating member engages the recess 51 of the pinion gear 50, rotation of the crank 36 via the handle 38 will be transmitted through the pinion gear 50 to the drum gear 54 to rotate the drum 58.

The integrated concept of this invention allows the operator to operate a jack 12 and winch 14 with one handle 38. As described above, and as shown in the drawings, a manual force may be applied to the handle 38 to move the crank to a position where an actuating member 37a and 37b engages the recess 35 of the crank bevel gear 34. Such positioning enables an operator to operate the jack portion 12 of the assembly by rotating the handle 38. Further, the handle 38 may be manually moved to an alternative position where the actuating member 37*a* and 37*b* engages the recess 51 of the pinion gear 50. Such positioning enables the operator to operate the winch 14 by rotating the handle 38. Thus, both a winch mechanism 14 and a jack mechanism 12 may be utilized in the same operating space with the same input device.

It is understood that a preferred embodiment of the invention is shown and described above to illustrate possible features of the invention, and numerous modifications could be made to the preferred embodiment. Therefore, the invention is not intended to be limited to the preferred embodiment described above, but rather is intended to be limited only by the claims set out below. Accordingly, the invention encompasses all alternate embodiments that fall literally or equivalently within the scope of these claims.

Having thus described the invention, we claim:

1. A jack-winch assembly comprising:
a jack;
a winch secured to said jack; and
a crank engageable with said winch and said jack to operate each independently, said crank being shiftable between a first position engaging said winch and a second position engaging said jack.

2. The jack-winch assembly of claim 1, wherein said jack is driven by a gear.

3. The jack-winch assembly of claim 2, wherein said crank includes an actuating member for engaging said gear.

4. The jack-winch assembly of claim 3, wherein said actuating member is a pin.

5. The jack-winch assembly of claim 3, wherein said actuating member is a nut.

6. The jack-winch assembly of claim 2 further comprising an actuating member for engaging said gear, wherein said actuating member is coupled to said crank.

7. The jack-winch assembly of claim 1, wherein said winch is driven by a gear.

8. The jack-winch assembly of claim 7, wherein said crank includes an actuating member for engaging said gear.

9. The jack-winch assembly of claim 8, wherein said actuating member is a pin.

10. The jack-winch assembly of claim 8, wherein said actuating member is a nut.

11. The jack-winch assembly of claim 7 further comprising an actuating member for engaging said gear, wherein said actuating member is coupled to said crank.

12. A jack-winch assembly comprising:
a winch comprising:
a base;
a drum rotatably secured to said base; and
a gear for driving said drum;
a jack secured to said winch;
an actuating member for independently engaging either said gear or said jack; and
a crank coupled with said actuating member and shiftable between a first position and a second position, where said actuating member engages said gear when said crank is in said first position and said actuating member engages said jack when said crank is in said second position.

13. The jack-winch assembly of claim 12, wherein said gear includes a recess for engagingly receiving said actuating member.

14. The jack-winch assembly of claim 12, wherein said actuating member is a pin.

15. The jack-winch assembly of claim 12, wherein said actuating member is a nut.

16. The jack-winch assembly of claim 12, wherein said actuating member is integrally formed with said crank.

17. A jack-winch assembly comprising:
a jack comprising:
an outer tube;
an inner tube telescopically slidable within said outer tube;
a rotatable screw shaft operable to extend and retract said inner tube and said outer tube relative to each other; and
a gear set comprising a driven gear mounted to said screw shaft and a driving gear operatively engaging said driven gear;
a winch secured to said outer tube of said jack; and
a crank engageable with said winch and engageable with said driving gear to operate each independently, said crank being shiftable between a first position engaging said winch and a second position engaging said driving gear, said crank including an actuating member for independently engaging either said winch or said jack gear.

18. The jack-winch assembly of claim 17, wherein said driving gear includes a recess for engagingly receiving said actuating member.

19. The jack-winch assembly of claim 17, wherein said actuating member is a pin.

20. The jack-winch assembly of claim 17, wherein said actuating member is a nut.

* * * * *